US009934585B2

(12) United States Patent
Oh

(10) Patent No.: US 9,934,585 B2
(45) Date of Patent: Apr. 3, 2018

(54) APPARATUS AND METHOD FOR REGISTERING IMAGES

(71) Applicant: Hanwha Techwin Co., Ltd., Changwon-si (KR)

(72) Inventor: Jaeyoon Oh, Changwon-si (KR)

(73) Assignees: HANWHA LAND SYSTEMS CO., LTD., Changwon-si (KR); Hanwha Techwin Co., Ltd., Changwon-si (KR)

( * ) Notice: Subject to any disclaimer, the term of this patent is extended or adjusted under 35 U.S.C. 154(b) by 137 days.

(21) Appl. No.: 14/872,642

(22) Filed: Oct. 1, 2015

(65) Prior Publication Data
US 2016/0117821 A1    Apr. 28, 2016

(30) Foreign Application Priority Data

Oct. 23, 2014    (KR) ........................ 10-2014-0144291

(51) Int. Cl.
*G06K 9/00* (2006.01)
*G06T 7/33* (2017.01)

(52) U.S. Cl.
CPC ..................................... *G06T 7/33* (2017.01)

(58) Field of Classification Search
CPC ............. A61B 6/022; G06K 2209/401; G06K 2009/4666; G06K 9/46; G06K 9/4604; G06K 9/48; G06K 9/461; G06T 2207/20228; H04N 2013/0074; H04N 2013/0077; H04N 2013/0081; H04N 2013/0085; H04N 2013/0088; H04N 2013/0092

USPC ....... 382/154, 190, 201, 205, 206, 210, 216, 382/218, 219, 255, 282, 283, 284, 289, 382/291, 294; 345/156, 178, 7; 348/139, 348/333.09, 341
See application file for complete search history.

(56) References Cited

U.S. PATENT DOCUMENTS

| | | | |
|---|---|---|---|
| 6,912,001 B2 | 6/2005 | Okamoto et al. | |
| 2007/0222858 A1* | 9/2007 | Sugimoto | G06K 9/00362 348/143 |
| 2012/0147139 A1* | 6/2012 | Li | G03B 35/08 348/43 |

(Continued)

FOREIGN PATENT DOCUMENTS

| | | |
|---|---|---|
| JP | 2007-266713 A | 10/2007 |
| KR | 2001-0107775 A | 12/2001 |

(Continued)

*Primary Examiner* — Aaron W Carter
(74) *Attorney, Agent, or Firm* — Sughrue Mion, PLLC

(57) ABSTRACT

There are provided an apparatus and method for registering images. The apparatus includes at least one processor configured to implement: a first transform model estimator configured to generate a first transform model based on corresponding feature points between a first image and a second image; a second transform model estimator configured to generate a second transform model based on corresponding feature points between a first partial image of the first image and a second partial image of the second image, the second partial image being generated based on the first partial image; and a registrator configured to register the first image and the second image by transforming the first partial image using the first transform model and the second transform model.

20 Claims, 13 Drawing Sheets

(56) References Cited

U.S. PATENT DOCUMENTS

| | | | | |
|---|---|---|---|---|
| 2012/0177283 | A1* | 7/2012 | Wang | G06T 17/00 |
| | | | | 382/154 |
| 2012/0177284 | A1* | 7/2012 | Wang | G06T 15/205 |
| | | | | 382/154 |
| 2013/0129144 | A1* | 5/2013 | Chang | G06K 9/62 |
| | | | | 382/103 |
| 2013/0329019 | A1* | 12/2013 | Matsuoka | H04N 13/0217 |
| | | | | 348/49 |
| 2015/0055873 | A1* | 2/2015 | Lee | G06K 9/6289 |
| | | | | 382/197 |
| 2015/0294490 | A1* | 10/2015 | Lin | G06T 7/40 |
| | | | | 382/195 |
| 2016/0088287 | A1* | 3/2016 | Sadi | H04N 19/54 |
| | | | | 348/43 |
| 2016/0117820 | A1* | 4/2016 | Oh | G06K 9/6202 |
| | | | | 348/47 |
| 2016/0125585 | A1* | 5/2016 | Oh | G06T 7/003 |
| | | | | 348/47 |
| 2016/0295134 | A1* | 10/2016 | Beall | G06T 7/80 |

FOREIGN PATENT DOCUMENTS

| | | |
|---|---|---|
| KR | 10-2005-0063991 A | 6/2005 |
| KR | 10-2010-0008886 A | 1/2010 |
| KR | 10-2010-0015141 A | 2/2010 |

\* cited by examiner

APPARATUS AND METHOD FOR REGISTERING IMAGES

CROSS-REFERENCE TO RELATED APPLICATION

This application claims priority from Korean Patent Application No. 10-2014-0144291, filed on Oct. 23, 2014, in the Korean Intellectual Property Office, the disclosure of which is incorporated herein in its entirety by reference.

BACKGROUND

1. Field

Methods and apparatuses consistent with exemplary embodiments relate to an apparatus and method for registering images.

2. Description of the Related Art

In technical applications of image processing, such as surveillance systems and medical photography, extensive research has been conducted on complementary information fusion technology using two or more sensors for improving the accuracy and reliability of algorithms for variation detection, motion detection, high-resolution image restoration, object recognition and tracking, etc.

SUMMARY

One or more exemplary embodiments relate to an apparatus and method for registering images without parallax errors between objects at different distances.

Various aspects of the inventive concept will be set forth in part in the description which follows and, in part, will be apparent from the description, or may be learned by practice of the presented embodiments.

According to an aspect of an exemplary embodiment, there is provided an apparatus for registering images, the apparatus including: a first transform model estimator configured to generate a first transform model based on corresponding feature points between a first image and a second image; a second transform model estimator configured to generate a second transform model based on corresponding feature points between a first partial image of the first image and a second partial image of the second image, the second partial image being generated based on the first partial image; and a registrator configured to register the first image and the second image by transforming the first partial image using the first transform model and the second transform model.

The second transform model estimator may include: a first partial image generator configured to generate the first partial image, the first partial image being a segmentation of the first image which includes an object detected from the first image; a second partial image generator configured to generate the second partial image from the second image, the second partial image being a segmentation of the second image corresponding to a first transform image obtained by transforming the first partial image using the first transform model; and an estimator configured to generate the second transform model based on corresponding feature points between the first transform image and the second partial image.

The first partial image and the second partial image may include a region of the object and a surrounding region larger than the region of the object by a predetermined factor.

The first partial image generator may be further configured to determine the segmentation based on whether the object included in the segmentation satisfies preset conditions.

The preset conditions may indicate at least one of object temperature and object motion.

The registrator may be further configured to transform the first partial image into a first transform image using the first transform model, transform the first transform image into a second transform image using the second transform model, and register the second transform image and the second image.

The first image may be a thermal image, and the second image may be a visible light image.

According to another aspect of an exemplary embodiment, there is provided an apparatus for registering images, the apparatus including: a first estimator configured to generate a first transform model based on corresponding feature points between a first image and a second image; a partial image generator configured to generate a first partial image by extracting an image including an object from a preliminary transform image obtained by transforming the first image using the first transform model, and generate a second partial image by extracting an image corresponding to the first partial image from the second image; a second estimator configured to generate a second transform model based on corresponding feature points between the first partial image and the second partial image; and a registrator configured to register the first image and the second image by transforming the first partial image using the second transform model.

The first partial image and the second partial image may include a region of the object and a surrounding region larger than the region of the object by a predetermined factor.

The registrator may be further configured to transform the first image into the preliminary transform image using the first transform model, transform the first partial image into a final transform image using the second transform model, and register the final transform image and the second image.

The first image may be a thermal image, and the second image may be a visible light image.

According to another aspect of an exemplary embodiment, there is provided a method of registering images, the method including: generating a first transform model based on corresponding feature points between a first image and a second image; generating a second transform model based on corresponding feature points between a first partial image of the first image and a second partial image of the second image, the second partial image being generated based on the first partial image; and registering the first image and the second image by transforming the first partial image using the first transform model and the second transform model.

The estimating of the second transform model may include: generating the first partial image, the first partial image being a segmentation of the first image which includes an object detected from the first image; generating the second partial image from the second image, the second partial image being a segmentation of the second image corresponding to a first transform image obtained by transforming the first partial image using the first transform model; and generating the second transform model based on corresponding feature points between the first transform image and the second partial image.

The estimating of the second transform model may include: generating the first partial image, the first partial image being a segmentation of the first image which includes an object detected from the first image; generating the second partial image from the second image, the second partial image being a segmentation of the second image corresponding to a first transform image obtained by transforming the first partial image using the first transform model; and generating the second transform model based on corresponding feature points between the first transform image and the second partial image.

The first partial image and the second partial image may include a region of the object and a surrounding region larger than the region of the object by a predetermined factor.

The registering of the first image and the second image may include: transforming the first partial image into a first transform image using the first transform model; transforming the first transform image into a second transform image using the second transform model; and registering the second transform image and the second image.

The first image is may be thermal image, and the second image may be a visible light image.

According to another aspect of an exemplary embodiment, there is provided a method of registering images, the method including: generating a first transform model based on corresponding feature points between a first image and a second image; generating a first partial image by extracting an image including an object from a preliminary transform image obtained by transforming the first image using the first transform model, and generate a second partial image by extracting an image corresponding to the first partial image from the second image; generating a second transform model based on corresponding feature points between the first partial image and the second partial image; and registering the first image and the second image by transforming the first partial image using the second transform model.

The first partial image and the second partial image may include a region of the object and a surrounding region larger than the region of the object by a predetermined factor.

The registering of the first image and the second image may include: transforming the first image into the preliminary transform image using the first transform model; transforming the first partial image into a final transform image using the second transform model; and registering the final transform image and the second image.

The first image may be a thermal image, and the second image may be a visible light image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
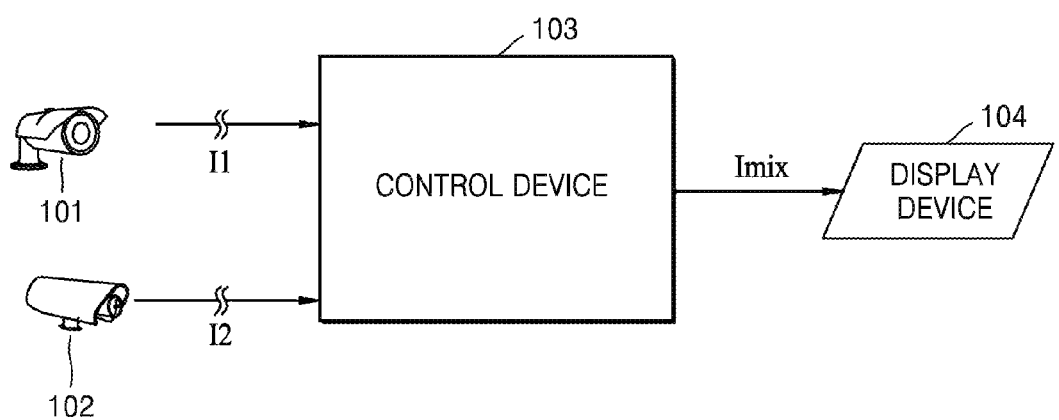
FIG. 1 is a diagram illustrating a camera system for performing an image registering method according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. The exemplary embodiments are described below with reference to the figures. As used herein, the term "and/or" includes any and all combinations of one or more of the associated listed items. Expressions such as "at least one of," when preceding a list of elements, modify the entire list of elements and do not modify the individual elements of the list.

The following description and accompanying drawings are provided for clear understanding of the inventive concept, and configurations that those of ordinary skill in the art could easily conceived of may not be described.

In addition, the following exemplary embodiments and accompanying drawings are provided for illustrative purposes only and are not intended to limit the scope of the inventive concept. The scope and spirit of the inventive concept should be defined by the appended claims. Terms used herein should be construed as having meanings and concepts matching the inventive concept so that the inventive concept could be properly explained.

It will be understood that although the terms "first" and "second" are used herein to describe various elements, these elements should not be limited by these terms. Terms are only used to distinguish one element from other elements.

The inventive concept of the present disclosure may be embodied as functional blocks and various processing operations. The functional blocks may be implemented with various hardware and/or software configurations executing specific functions. For example, exemplary embodiments of the present disclosure may employ integrated circuit configurations such as a memory, a processing unit, a logic unit, a look-up table and the like capable of executing various functions upon control of microprocessors or other control devices. In a similar manner to that in which the elements of the exemplary embodiments can be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

Exemplary embodiments will now be described with reference to the accompanying drawings.

FIG. 1 is a diagram illustrating a camera system for performing an image registering method according to an exemplary embodiment.

Referring to FIG. 1, the camera system may include a first image sensor 101 and a second image sensor 102. The first and second image sensors 101 and 102 may be cameras having different characteristics and configured to provide image information by photographing the same scene. The first and second image sensors 101 and 102 may each have a pan/tilt/zoom (PTZ) function and may capture images of the same object at different zoom magnifications while being panned and tilted together. For example, the first and second image sensors 101 and 102 may be built in an outside or inside wall of an office, a house, a hospital, a bank, or a public building requiring security for the purpose of access control or crime prevention. The first and second image sensors 101 and 102 may have various shapes, e.g., a linear shape or a dome shape, according to the installation place or purposes thereof.

The first image sensor 101 may be a thermal imaging camera. The first image sensor 101 may capture a thermal image of an object (subject) according to the temperature distribution of the object and may output the thermal image as a first image I1. The second image sensor 102 may be a visible light camera. The second image sensor 102 may capture a visible light image of the object and may output the visible light image as a second image I2.

A control device 103, i.e., registering device, may register and fuse the first image I1 output from the first image sensor 101 and the second image I2 output from the second image sensor 102. The term "register" means to match positional information of two or more images so as to arrange the images in a single coordinate system. The term "fuse" means to adjust the grayscales of original images of an image obtained by registering the original images. A registration method using the control device 103 will now be described.

The control device 103 provides an image Imix obtained by registering and fusing the first image I1 and the second image I2 to a display device 104 or client terminals. In addition, the control device 103 may store the first image I1, the second image I2, or the image Imix in a storage, e.g., a memory.

Figure 2:
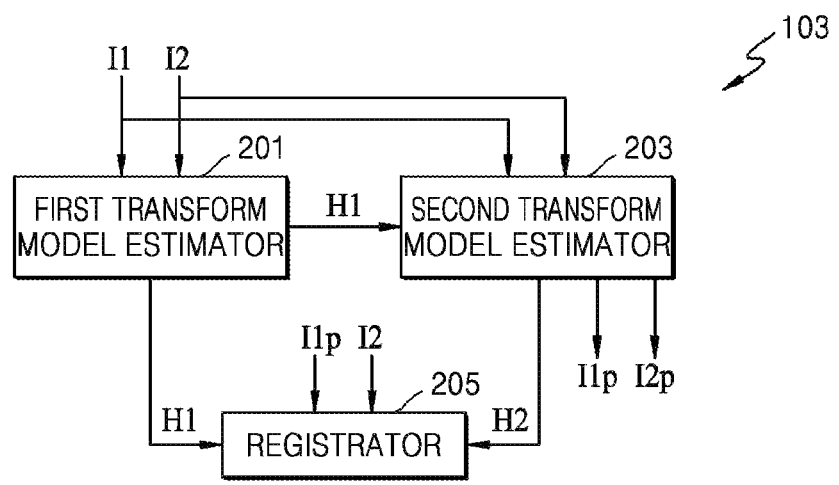
FIG. 2 is a block diagram illustrating a configuration of the control device according to an exemplary embodiment.

FIG. 2 is a block diagram illustrating a configuration of the control device 103 according to an exemplary embodiment.

Referring to FIG. 2, the control device 103 may include a first transform model estimator 201, the second transform model estimator 203, and the registrator 205.

A transform model H is a matrix indicating a geographical transform relationship between two images. The transform model H is a 3×3 2D homography matrix such as Formula 1 expressing a transformational relationship between two 2D images existing in a 3D space.

$$H = \begin{pmatrix} h_{11} & h_{12} & h_{13} \\ h_{21} & h_{22} & h_{23} \\ h_{31} & h_{32} & h_{33} \end{pmatrix} \quad (1)$$

Elements h11 to h33 of the transform model H include rotation information indicating a rotation angle, translation information indicating the amounts of movement in x, y, and z axes, and scaling information indicating a degree of scale in the x, y, and z axes.

The first transform model estimator 201 may estimate a first transform model H1 based on information about feature points extracted from a first image I1 captured using the first image sensor 101 and feature points extracted from a second image I2 captured using the second image sensor 102. The first transform model H1 may be a global transform model estimated based on the first image I1 and the second image I2. The first transform model H1 may be previously estimated using a reference object located at a reference distance, or may be estimated from each image frame captured in real time or periodically from image frames captured in real time.

The first transform model estimator 201 detects feature points from each of the first and second images I1 and I2. The first transform model estimator 201 may extract feature points such as corners, edges, contours, or line intersections from each of the first and second images I1 and I2 using an algorithm for extracting feature points from an image. For example, a scale invariant feature transform (SIFT) algorithm, a Harris corner algorithm, or a smallest univalue segment assimilating nucleus (SUSAN) algorithm may be used. The exemplary embodiments of the present disclosure are not limited to a particular feature point extraction algorithm. That is, various feature point extraction algorithms may be used in the exemplary embodiments of the present disclosure.

The first transform model estimator 201 may select corresponding feature points between the first and second images I1 and I2. For example, the first transform model estimator 201 may determine one of the first and second images I1 and I2 as a reference image and may select feature points of the other image corresponding to feature points of the reference image.

The first transform model estimator 201 may estimate the first transform model H1 based on the selected feature points. The first transform model estimator 201 may estimate the first transform model H1 such as Formula 1 explained above by using a sampling method such as a random sample consensus (RANSAC) algorithm in combination with a linear algebraic calculation method such as a singular value decomposition method or a least square error method. A sampling method or a linear algebraic calculation method used herein is not limited to a particular one and other sampling methods or linear algebraic calculation methods may be used to estimate the first transform model H1 in other exemplary embodiments.

The second transform model estimator 203 may estimate a second transform model H2 based on feature points extracted from a first partial image I1p generated from the first image I1 and feature points extracted from a second partial image I2p generated from the second image I2. The second transform model H2 may be a local transform model estimated based on the first partial image I1p and the second partial image I2p.

Figure 3:
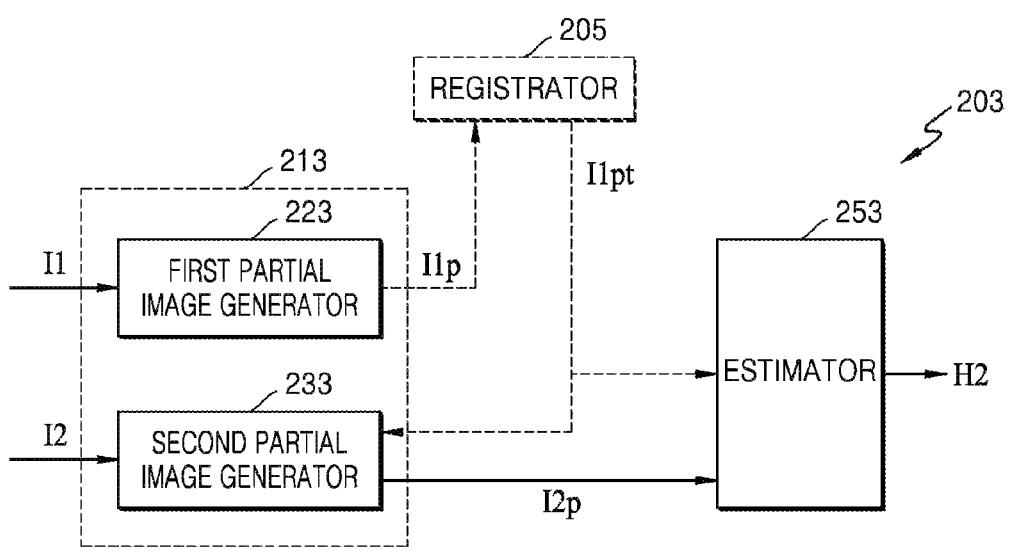
FIG. 3 is a block diagram illustrating a second transform model estimator according to an exemplary embodiment.

FIG. 3 is a block diagram illustrating a second transform model estimator 203.

Referring to FIG. 3, the second transform model estimator 203 may include a partial image generator 213 and an estimator 253. The partial image generator 213 may include a first partial image generator 223 and a second partial image generator 233.

The first partial image generator 223 may generate a first partial image I1p from the first image I1.

The first partial image generator 223 may determine one or more objects from the first image I1 and separate the objects from the first image I1 by segmenting the first image I1. The first partial image generator 223 may separate the objects from a background (the first image I1) using a segmentation algorithm. For example, a thresholding method using the brightness level of the first image I1, a segmentation method using the contours of the objects, or a watershed algorithm may be used. The objects to be separated from the first image may be determined based on various criteria. For example, the first partial image generator 223 may determine one or more objects which are in motion by a motion detection method.

The first partial image generator 223 may label the objects separated from the first image I1. The labeled objects may be block images including the objects and having predetermined widths and heights, or the labeled objects may be images having shapes corresponding to the shapes of the objects. The remaining region of the first image I1 other than the objects may be a masked image. That is, all of the labeled images of the objects may be first partial images I1p. The first partial images I1p may include information about images including the objects and information about the center coordinates of the objects. The first partial images I1p may be accessed using the information about the center coordinates of the objects.

Alternatively, the first partial image generator 223 may select the first partial images I1p among the labeled images based on predetermined one or more criteria. For example, some images may be selected as the first partial images I1p if they have an object temperature equal to or greater than a reference temperature, if they have an object of which movement amount equal to or greater than a reference movement amount, or if they have a temperature variation amount equal to or greater than a reference temperature variation amount.

The first partial images I1p may include regions of the objects and surrounding regions larger than the objects by a predetermined factor in a horizontal direction and a vertical direction.

The second partial image generator 233 may generate second partial images I2p from the second image I2 based on the first partial images I1p. The second partial image generator 233 may set regions of the second image I2 corresponding to the first partial images I1p as the second partial images I2p and may extract the set second partial images I2p from the second image I2. The registrator 205 may apply the first transform model H1 to the first partial images I1p to generate first transform images I1pt. The second partial image generator 233 may receive the first transform images I1pt from the registrator 205. Then, regions of the second images I2 corresponding to the first transform images I1pt and surrounding regions larger than the regions by a predetermined factor in a horizontal direction and a vertical direction may selected as the second partial images I2p by the second partial image generator 233.

The estimator 253 may estimate a second transform model H2 by matching feature points of the first transform images I1pt and the second partial images I2p. The estimator 253 detects feature points from the first transform images I1pt and the second partial images I2p. The estimator 253 may extract feature points such as corners, edges, contours, or line intersections using an algorithm such as an SIFT algorithm, a Harris corner algorithm, or a SUSAN algorithm. The exemplary embodiments of the present disclosure are not limited to a particular characteristic feature extraction algorithm. That is, various feature point extraction algorithms may be used in the exemplary embodiments of the present disclosure.

The estimator 253 may select corresponding feature points between the first transform images I1pt and the second partial images I2p. The estimator 253 may set either the first transform images I1pt or the second partial images I2p as reference images, and may select corresponding feature points between the reference images and the other images. The estimator 253 may estimate the second transform model H2 based on the selected corresponding feature points. The estimator 253 may estimate the second transform model H2 such as Formula 1 explained above by using a sampling method such as an RANSAC algorithm in combination with a linear algebraic calculation method such as a singular value decomposition method or a least square error method. A sampling method or a linear algebraic calculation method used herein is not limited to a particular one and other sampling methods or linear algebraic calculation methods may be used to estimate the second transform model H2 in other exemplary embodiments.

Figure 4:
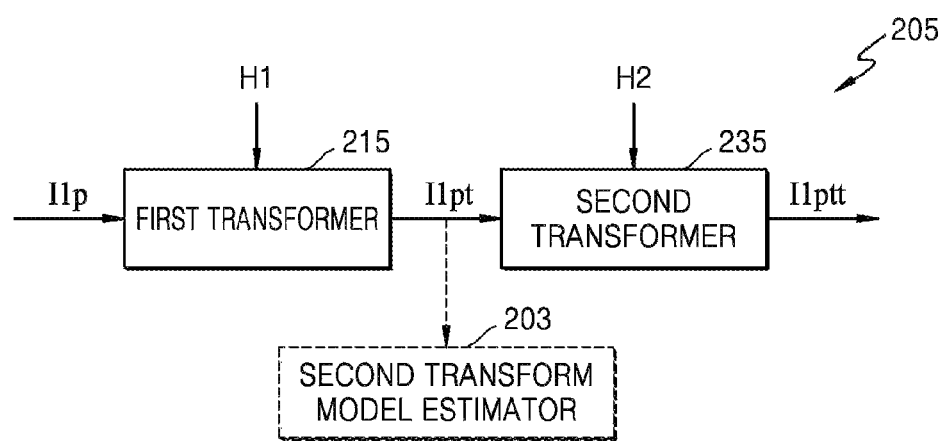
FIG. 4 is a block diagram illustrating a registrator according to an exemplary embodiment.

FIG. 4 is a block diagram illustrating a registrator 205 according to an exemplary embodiment.

The registrator 205 may register the first partial images I1p and the second image I2 using the first transform model H1 and the second transform model H2. Referring to FIG. 4, the registrator 205 may include a first transformer 215 and a second transformer 235. The first transformer 215 may generate the first transform images I1pt from the first partial images I1p by using the first transform model H1. The second transformer 235 may generate second transform images I1pt from the first transform images I1pt by using the second transform model H2. Then, the registrator 205 may register the second transform images I1pt and the second image I2.

In an exemplary embodiment, a second transform model H2 may be estimated for each object of an image, and objects of the image may be independently transformed so as to register the objects without parallax errors.

Figure 5:
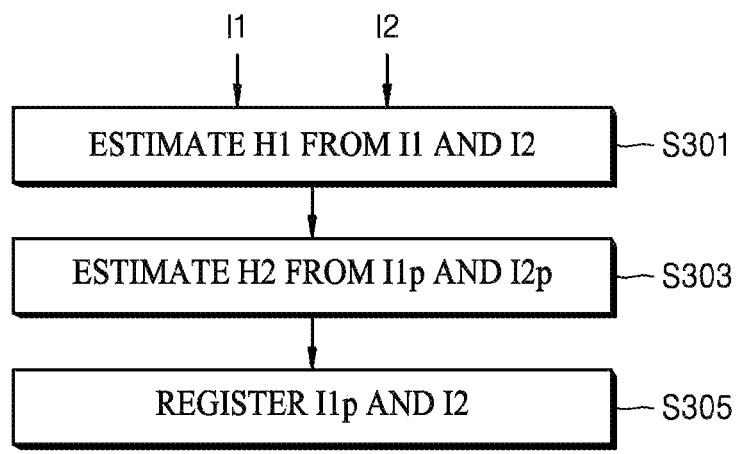
FIG. 5 is a flowchart illustrating a method of registering images according to an exemplary embodiment.

FIG. 5 is a flowchart illustrating a method of registering images according to an exemplary embodiment. The same descriptions as those given above with reference to FIGS. 1 to 4 will not be repeated here.

In operation S301, the control device 103 may estimate a first transform model H1 based on a first image I1 and a second image I2. The first transform model estimator 201 may estimate the first transform model H1 based on information about feature points extracted from the first image I1 captured using the first image sensor 101 and the second image I2 captured using the second image sensor 102. As aforementioned, the first image I1 may be a thermal image, and the second image I2 may be a visible light image.

In operation S303, the control device 103 may estimate a second transform model H2 based on first partial images I1p generated from the first image I1 and second partial images I2p generated from the second image I2.

In operation S305, the control device 103 may register I1p and I2. Specifically, the control device 103 may generate final transform images I1pt from the first partial images I1p through multiple transformation operation, e.g., two transformation operations using the first transform model H1 and the second transform model H2.

Figure 6:
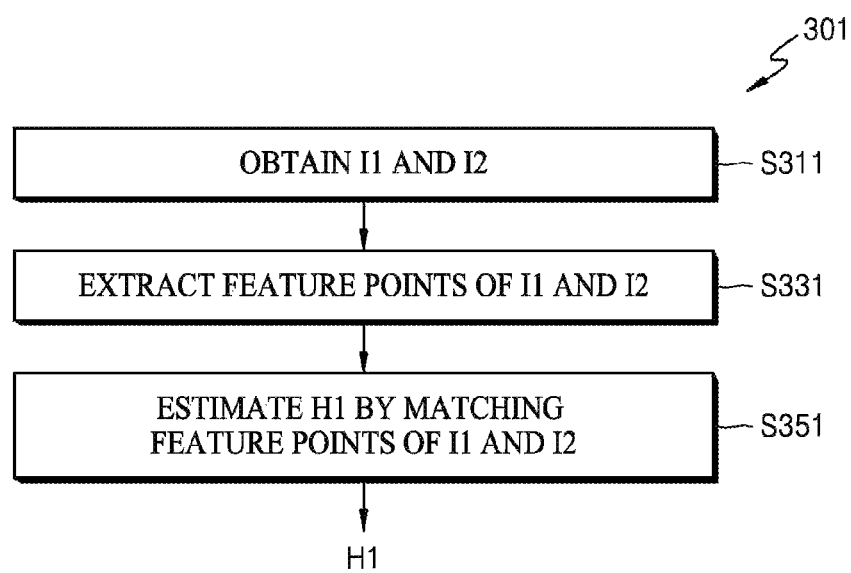
FIG. 6 is a flow chart illustrating a method of estimating a first transform model according to an exemplary embodiment.

FIG. 6 is a flow chart illustrating a method of estimating a first transform model according to an exemplary embodiment.

In operation S311, the first transform model estimator 201 obtains the first image I1 and the second image I2.

In operation S331, the first transform model estimator 201 detects feature points from the first and second images I1 and I2.

In operation S351, the first transform model estimator 201 may estimate the first transform model H1 such as Formula 2 below by matching feature points of the first and second images I1 and I2.

$$H1 = \text{Transform\_Model\_Estimation}(I1, I2) \quad (2)$$

Referring again to FIG. 5, the second transform model estimator 203 may estimate the second transform model H2 based on feature points extracted from the first partial images I1p generated from the first image I1 and feature points extracted from the second partial images I2p generated from the second image I2 based on the first partial images I1p (S303 of FIG. 5).

Figure 7:
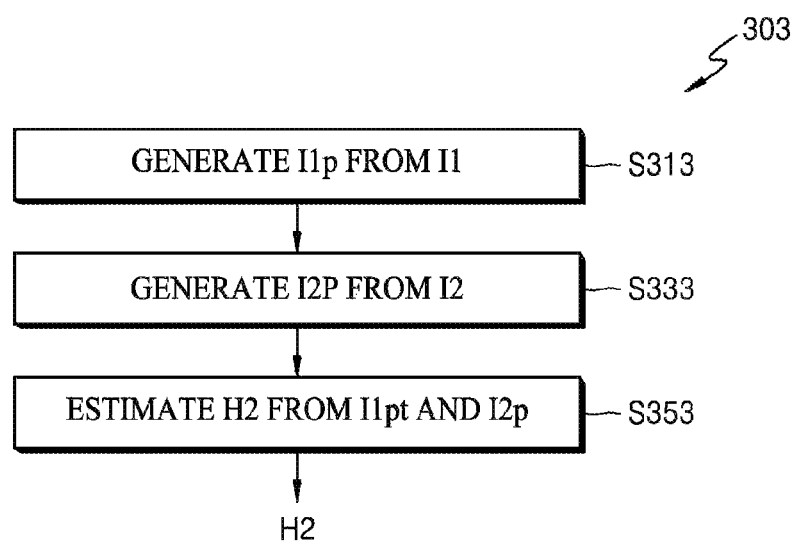
FIG. 7 is a flow chart illustrating a method of estimating a second transform model according to an exemplary embodiment.

FIG. 7 is a flow chart illustrating a method of estimating a second transform model according to an exemplary embodiment.

In operation S313, the second transform model estimator 203 may generate the first partial images I1p from the first image I1. The second transform model estimator 203 may segment the first image I1 to separate objects from the first image I1. The second transform model estimator 203 may label the objects object_1, object_2, . . . , and object_n. In this way, the second transform model estimator 203 may generate n first partial images I1p, each of the first partial images I1p including one object. The n first partial images I1p may include the objects and surrounding regions larger than the objects by a predetermined factor in a horizontal direction and a vertical direction.

In operation S333, the second transform model estimator 203 may generate the second partial images I2p from the second image I2 based on the n first partial images I1p.

In operation S353, the second transform model estimator 203 may estimate the second transform model H2 by matching feature points of the first transform images I1pt and the second partial images I2p.

Figure 8:
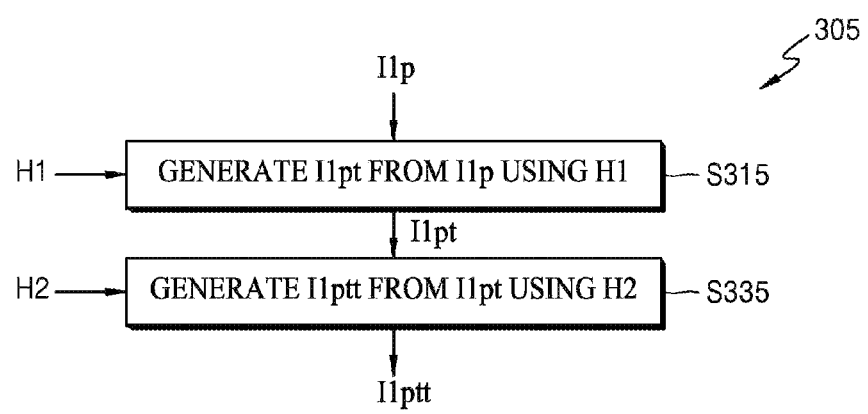
FIG. 8 is a flow chart illustrating a method of registering images using multiple transform models according to an exemplary embodiment.

FIG. 8 is a flow chart illustrating a method of registering images using multiple transform models according to an exemplary embodiment.

In operation S315, the registrator 205 may primarily transform the n first partial images I1p using the first transform model H1 so as to generate first transform images I1pt. For example, as expressed by Formula 3 below, the registrator 205 may primarily transform the n first partial images I1p using the first transform model H1 so as to generate n first transform images I1pt.

$$I1\text{pt\_object\_1} = \text{Transform}(I1\text{p\_object\_1}, H1) \quad (3)$$

$$I1\text{pt\_object\_2} = \text{Transform}(I1\text{p\_object\_2}, H1)$$

$$\ldots$$

$$I1\text{pt\_object\_n} = \text{Transform}(I1\text{p\_object\_n}, H1)$$

As expressed by Formula 4 below, the second transform model estimator 203 may select regions of the second image I2 respectively corresponding to the objects of the n first transform images I1pt, and surrounding regions larger than the regions by a predetermined factor in a horizontal direction and a vertical direction. Then, the second transform model estimator 203 may set the regions and surrounding regions as the second partial images I2p.

$$I2\text{p\_1} = \text{Crop}(I2, \text{surrounding\_area\_1}) \quad (4)$$

$$I2\text{p\_2} = \text{Crop}(I2, \text{surrounding\_area\_2})$$

$$\ldots$$

$$I2\text{p\_n} = \text{Crop}(I2, \text{surrounding\_area\_n})$$

As aforementioned, the second transform model estimator 203 may estimate the second transform model H2 by matching feature points of the first transform images I1pt and the second partial images I2p (S353 of FIG. 7). Specifically, the second transform model estimator 203 may estimate the second transform model H2 by extracting feature points from the first transform images I1pt and the second partial images I2p, and matching the feature points of the first transform images I1pt and the second partial images I2p. As expressed by Formula 5 below, the second transform model estimator 203 may estimate n second transform models H2 by matching feature points of n first transform images I1pt with feature points of n second partial images I2p corresponding to the n first transform images I1pt.

$$H2\_1 = \text{Transform\_Model\_Estimation}(I2\text{p\_1}, I1\text{pt\_object\_1}) \quad (5)$$

$$H2\_2 = \text{Transform\_Model\_Estimation}(I2\text{p\_2}, I1\text{pt\_object\_2})$$

$$\ldots$$

$$H2\_n = \text{Transform\_Model\_Estimation}(I2\text{p\_n}, I1\text{pt\_object\_n})$$

As aforementioned, the registrator 205 may register second transform images from the first partial images I1p and the second image I2 (S305 of FIG. 5).

Returning to FIG. 8, in operation S335, the registrator 205 may secondarily transform the first transform images I1pt using the second transform models H2 so as to generate second transform images I1ptt. As expressed by Formula 6 below, the registrator 205 may secondarily transform the n first transform images I1pt using the n second transform models H2 to generate n second transform images I1ptt.

$$I1\text{ptt\_object\_1} = \text{Tramsform}(\text{Tramsform}(I1\text{p\_object\_1}, H1), H2\_1) \quad (6)$$

$$I1\text{ptt\_object\_2} = \text{Tramsform}(\text{Tramsform}(I1\text{p\_object\_2}, H1), H2\_2)$$

$$\ldots$$

$$I1\text{ptt\_object\_n} = \text{Tramsform}(\text{Tramsform}(I1\text{p\_object\_n}, H1), H2\_n)$$

The registrator 205 may register the n second transform images I1ptt respectively together with the second image I2.

Each of the first and second images I1 and I2 is an image obtained by projecting 3D spatial information on a 2D image sensor surface. Therefore, if a plurality of objects are located at different distances, the precision of image registration using a global transform model may vary according to the distances of the objects. That is, objects close to a camera have a larger parallax than objects distant from the camera.

Figure 9:
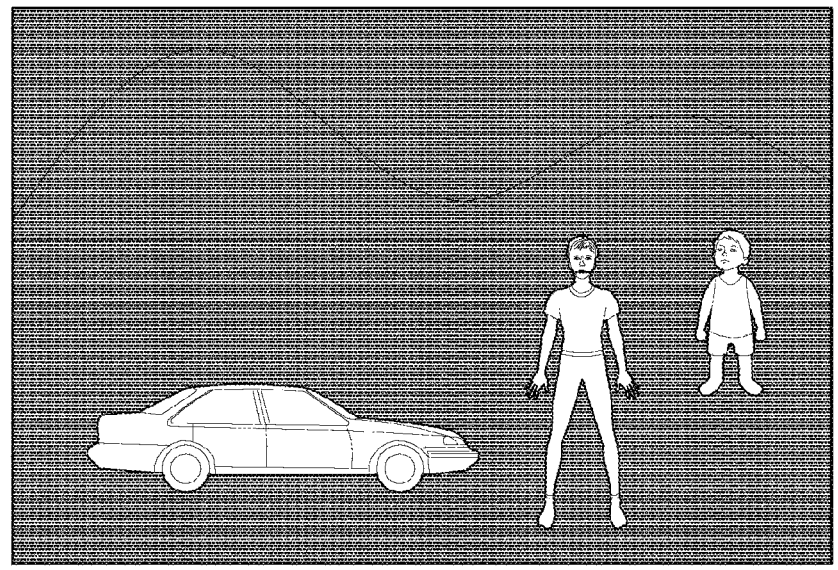
FIGS. 9 to 12 are images for illustrating improved results of image registration according to an exemplary embodiment.
Figure 10:
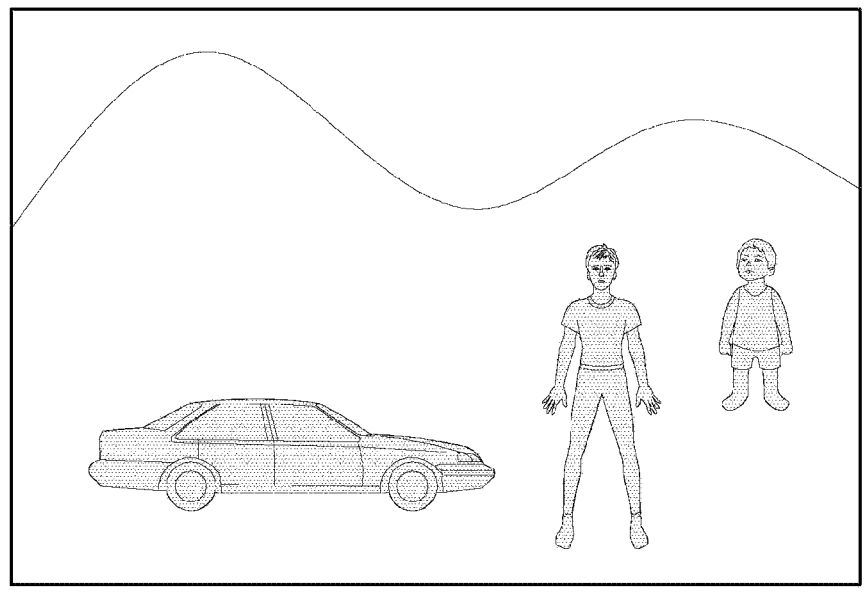
Figure 11:
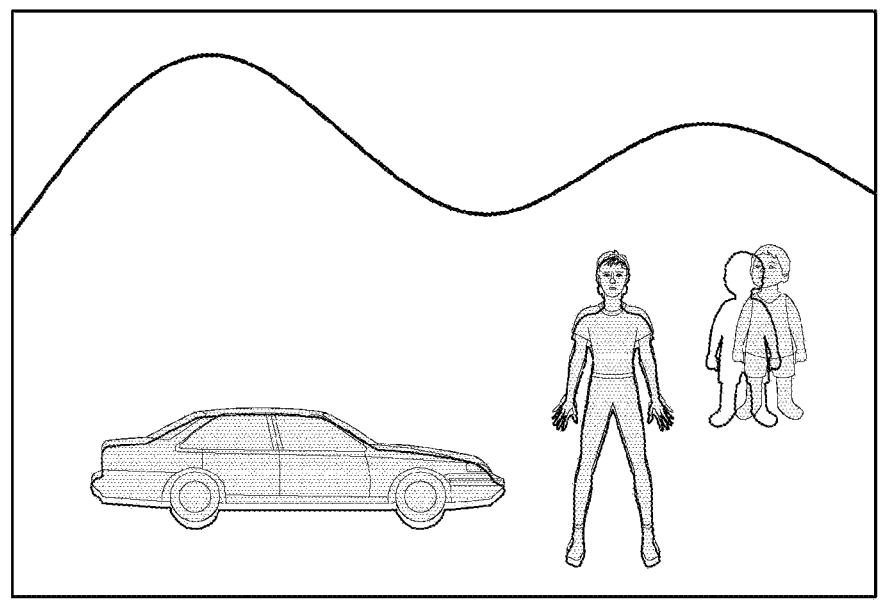

FIG. 9 is an exemplary first image I1, FIG. 10 is an exemplary second image I2, and FIG. 11 is an image obtained by registering the first and second images I1 and I2 using a global transform model and then fusing the first and second images I1 and I2. As shown in FIG. 11, the degree of parallax varies according to the distances to objects, thereby lowering the precision of registration.

Figure 12:
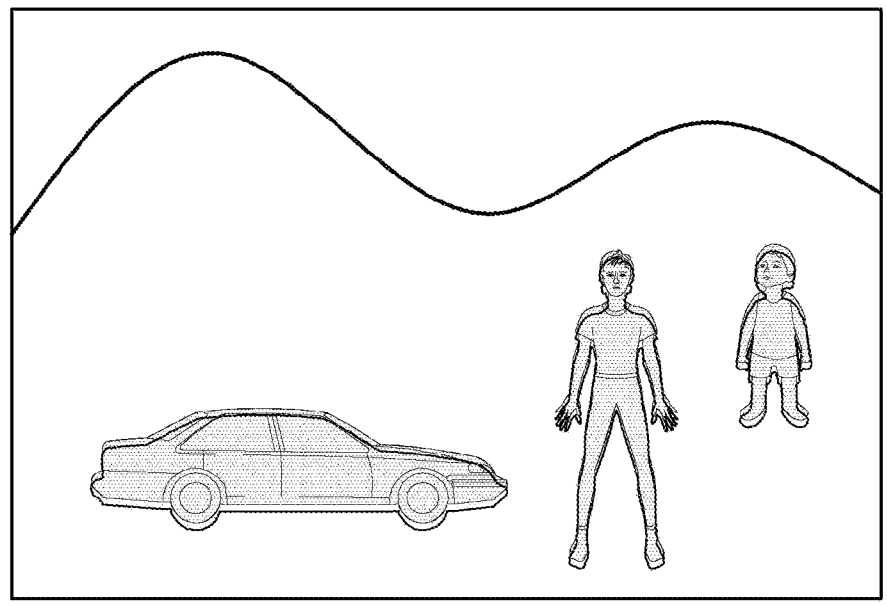

FIG. 12 is an image obtained by estimating local transform models for objects and independently registering the objects using the local transform models, according to an exemplary embodiment. As shown in FIG. 12, registration errors caused by different distances of the objects are significantly reduced, compared to the image of FIG. 11.

If an object recognized from a first image I1 has a high degree of importance and a small size, the control device 103 may control a zoom function of the second image sensor 102 for zooming in. On the other hand, if an object recognized from the first image I1 has a high degree of importance and a large size, the control device 103 may control the zoom function of the second image sensor 102 for zooming out. The control device 103 may monitor an object using zoomed-in or zoomed-out images captured using the second image sensor 102.

Figure 13:
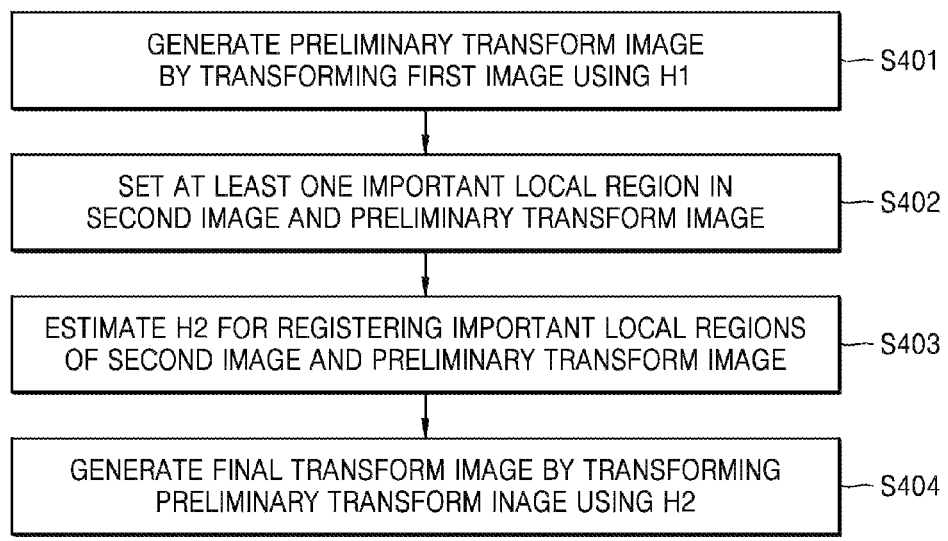
FIG. 13 is a flowchart illustrating a method of registering images according to another exemplary embodiment.

FIG. 13 is a flowchart illustrating a method of registering images according to another exemplary embodiment.

The exemplary embodiment illustrated in FIG. 13 is different from the exemplary embodiment illustrated in FIG. 5, in that a preliminary transform image is generated by transforming a first image I1 using a first transform model H1, and local transform models are estimated for corresponding regions of a second image I2 and the preliminary transform image.

In operation S401, the control device 103 generates a preliminary image by transforming a first image I1 using a first transform model H1. The control device 103 may estimate the first transform model H1 based on the first image I1 and a second image I2 as a global transform model for transforming positions of pixels of the first image I1. The control device 103 may generate the preliminary transform image from the first image I1 using the first transform model H1. The first transform model H1 may be previously estimated using a reference object located at a reference distance. Alternatively, the first transform model H1 may be estimated in real time for a photographed object. The first image I1 may be a thermal image, and the second image I2 may be a visible light image.

In operation S402, the control device 103 may set at least one important local region in the preliminary transform image and the second image I2. The important local region may be determined based on one or more predetermined criteria. For example, a region of the first image I1 having a temperature equal to or greater than a predetermined temperature and/or a region of the first image I1 in which a motion is detected may be determined to be the important local region. The control device 103 may set a local region(s) of the preliminary transform image corresponding to the important local region(s) of the first image I1 as an important local region(s) of the preliminary transform image. The control device 103 may set a local region(s) of the second image I2 corresponding to the important local region(s) of the preliminary transform image as an important local region(s) of the second image I2.

After setting the important local regions of the second image I2 and the preliminary transform image, in operation S403, the control device 103 may estimate a second transform model H2 for registering corresponding important local regions of the second image I2 and the preliminary transform image. As many second transform models H2 as the number of important local regions may be estimated.

In operation S404, the control device 103 may generate a final transform image by transforming the preliminary transform image using the second transform model H2 being a local transform model. The control device 103 may transform coordinates of n important local regions of the preliminary transform image using the second transform model H2 and may generate the final transform image by applying the n important local regions to the preliminary transform image.

The control device 103 may register the final transform image and the second image.

According to the one or more of the above exemplary embodiments, complementary images such as computerized tomography (CT) images, magnetic resonance imaging (MRI) images, and positron emission tomography (PET) images may be registered for precise and accurate diagnosis. In addition, the one or more of the above exemplary embodiments may be applied to object recognizing and tracking systems used in monitoring and security applications so as to improve the reliability and precision of the systems by registering and fusing images captured using devices having different operational wavelength bands such as a visible light sensor and a long-wavelength infrared sensor. In addition, the one or more of the above exemplary embodiments may be applied to safe driving systems for automobiles.

As described above, according to one or more of the above exemplary embodiments, images of a plurality of objects may be registered without parallax between the objects caused by different distances of the objects by an estimation method using a multiple transform model.

At least one of the components, elements, modules or units represented by a block as illustrated in FIGS. 1-4 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for registering images, the apparatus comprising at least one processor configured to implement:
   a first transform model estimator configured to generate a first transform model based on corresponding feature points between a first image and a second image;
   a second transform model estimator configured to generate a second transform model based on a first partial image of the first image and a second partial image of the second image, the second partial image being generated based on the first partial image; and
   a registrator configured to register the first image and the second image by transforming the first partial image using the first transform model and the second transform model,
   wherein the second transform model estimator comprises:
      a second partial image generator configured to generate the second partial image from the second image, the second partial image being a segmentation of the second image corresponding to a first transform image obtained by transforming the first partial image using the first transform model; and
      an estimator configured to generate the second transform model based on corresponding feature points between the first transform image and the second partial image.

2. The apparatus of claim 1, wherein the second transform model estimator comprises
   a first partial image generator configured to generate the first partial image, the first partial image being a segmentation of the first image which comprises an object detected from the first image.

3. The apparatus of claim 2, wherein the first partial image and the second partial image comprise a region of the object and a surrounding region larger than the region of the object by a predetermined factor.

4. The apparatus of claim 2, wherein the first partial image generator is further configured to determine the segmentation based on whether the object included in the segmentation satisfies preset conditions.

5. The apparatus of claim 4, wherein the preset conditions indicate at least one of object temperature and object motion.

6. The apparatus of claim 1, wherein the registrator is further configured to transform the first partial image into a first transform image using the first transform model, transform the first transform image into a second transform image using the second transform model, and register the second transform image and the second image.

7. The apparatus of claim 1, wherein the first image is a thermal image, and the second image is a visible light image.

8. An apparatus for registering images, the apparatus comprising at least one processor configured to implement:
   a first estimator configured to generate a first transform model based on corresponding feature points between a first image and a second image;
   a partial image generator configured to generate a first partial image by extracting an image comprising an object from a preliminary transform image obtained by transforming the first image using the first transform model, and generate a second partial image by extracting an image corresponding to the first partial image from the second image;
   a second estimator configured to generate a second transform model based on corresponding feature points between the first partial image and the second partial image; and
   a registrator configured to register the first image and the second image by transforming the first partial image using the second transform model.

9. The apparatus of claim 8, wherein the first partial image and the second partial image comprise a region of the object and a surrounding region larger than the region of the object by a predetermined factor.

10. The apparatus of claim 8, the registrator is further configured to transform the first image into the preliminary transform image using the first transform model, transform the first partial image into a final transform image using the second transform model, and register the final transform image and the second image.

11. The apparatus of claim 8, wherein the first image is a thermal image, and the second image is a visible light image.

12. A method of registering images, the method comprising:
   generating, by at least one processor, a first transform model based on corresponding feature points between a first image and a second image;
   generating, by the processor, a second transform model based on a first partial image of the first image and a second partial image of the second image, the second partial image being generated based on the first partial image; and
   registering, by the processor, the first image and the second image by transforming the first partial image using the first transform model and the second transform model,
   wherein the generating of the second transform model comprises:
      generating the second partial image from the second image, the second partial image being a segmentation of the second image corresponding to a first transform image obtained by transforming the first partial image using the first transform model; and
      generating the second transform model based on corresponding feature points between the first transform image and the second partial image.

13. The method of claim 12, wherein the generating of the second transform model comprises
   generating the first partial image, the first partial image being a segmentation of the first image which comprises an object detected from the first image.

14. The method of claim 13, wherein the first partial image and the second partial image comprise a region of the object and a surrounding region larger than the region of the object by a predetermined factor.

15. The method of claim 12, wherein the registering of the first image and the second image comprises:
   transforming the first partial image into a first transform image using the first transform model;
   transforming the first transform image into a second transform image using the second transform model; and
   registering the second transform image and the second image.

16. The method of claim 12, wherein the first image is a thermal image, and the second image is a visible light image.

17. A method of registering images, the method comprising:
   generating, by at least one processor, a first transform model based on corresponding feature points between a first image and a second image;
   generating, by the processor, a first partial image by extracting an image comprising an object from a preliminary transform image obtained by transforming the first image using the first transform model, and generate a second partial image by extracting an image corresponding to the first partial image from the second image;
   generating, by the processor, a second transform model based on corresponding feature points between the first partial image and the second partial image; and
   registering, by the processor, the first image and the second image by transforming the first partial image using the second transform model.

18. The method of claim 17, wherein the first partial image and the second partial image comprise a region of the object and a surrounding region larger than the region of the object by a predetermined factor.

19. The method of claim 17, wherein the registering of the first image and the second image comprises:
   transforming the first image into the preliminary transform image using the first transform model;
   transforming the first partial image into a final transform image using the second transform model; and
   registering the final transform image and the second image.

20. The method of claim 17, wherein the first image is a thermal image, and the second image is a visible light image.

* * * * *